March 26, 1940.　P. H. BROWN ET AL　2,194,586
TIMING CONTROL MECHANISM
Filed Sept. 24, 1937　2 Sheets-Sheet 1

Inventors
P. H. Brown & R. M. Carson
By Thorpe & Thorpe
Attorneys

March 26, 1940.  P. H. BROWN ET AL  2,194,586
TIMING CONTROL MECHANISM
Filed Sept. 24, 1937  2 Sheets-Sheet 2

Inventors
P. H. Brown and R. M. Carson
By Thorpe & Thorpe
Attorneys

Patented Mar. 26, 1940

2,194,586

UNITED STATES PATENT OFFICE 2,194,586

TIMING CONTROL MECHANISM

Paul H. Brown and Russell M. Carson, Kansas City, Mo.; said Carson assignor to said Brown Application September 24, 1937, Serial No. 165,505

5 Claims. (Cl. 200—33)

This invention relates to timing control mechanism wherein there is an element having two extremes of operation, which for convenience may be referred to as "on" and "off" positions, in which it is desirable to maintain said element in its two distinct positions for predetermined periods of a unit time, together with means whereby this period or ratio of time "on" to time "off" is adjustable within infinite limits. In other words, assume a time unit of one hour, the device may be adjusted to maintain the element, say "on" for a total period of fifty minutes, down to "on" for a total period of ten minutes, or at any other point from continuously "on" to continuously "off" depending upon the accuracy of the parts and whether or not a micrometer adjustment is desired.

The invention will be found of particular value in the control of electric circuits by operating a switch in cycles of "on" to "off," where it is desirable to have an infinite range of adjustment of time "off" to time "on," such as in the testing of the starting or operating characteristics of electric motors and the like. Another practical application of the invention will be found to lie in the energization and deenergization of heating elements of any kind, such as, for example, those of electric cooking stoves, whereby the operation of the heating element can be exactly controlled to develop the desired temperature or heat output within a predetermined time. Heretofore, it has been customary to provide the open top of electric cooking stoves with hot plates having a plurality of coils to produce a series of stepped heat ranges, there being no control for temperatures intermediate the steps. With such a hot plate or heating control, it is obvious that the range of heat is not sufficiently flexible to suit all cooking requirements, and the only way such a stove can be successfully used with some cooking vessels, is by placing the vessel only partially over the hot plate, the balance of the developed B. t. u. being wasted. Therefore, another object of the invention is to develop a process for exactly controlling the thermal output of electrical heating elements of any kind, such as electric stoves, glue pots, hot plates and the like, within any predetermined unit of time, such result being accomplished by the operation of the controlling switch in cycles of time "on" to time "off," subject to exact adjustment of time ratio over its entire range of operation. By such method, it is obvious that a heating stove need have only one heating element of maximum B. t. u. output, and the use of resistances or other wasteful control methods is entirely avoided. In the preferred operation of the process, the heating element is turned to "on" position until it reaches its full B. t. u. output, and from that point on, the current to the heating element is interrupted in repetitive cycles of time "on" to time "off" to maintain the B. t. u. output per unit time at the value found most desirable for the particular cooking operation being conducted. The result is an electrical heating control which is just as flexible and more positive than the control of gas stove burners. It is, of course, to be understood that the operation herein described is entirely distinct from a thermostatic operation of an electrical or gas heating device in which the period of time of operation from "on" to "off" fluctuates in accordance with temperature, since the present invention involves an operating cycle varied by time only, over its entire range of operation.

Although a number of different types of apparatus may be produced for obtaining the beneficial advantages of the process in relation to the timing apparatus, only one type of preferred apparatus will be described and illustrated herein, it being understood, in this connection, that the electrical switch hereinafter referred to is to be considered as representative of any type of mechanism, whether electrical or not, which it may be desired to operate, subject to infinite adjustment, of "on" to "off" positions, and also that the heating element hereinafter referred to, is to be considered as representative of any type of electrical apparatus which it may be desired to provide with cyclic energization and deenergization, and that although the operation is described more particularly in relation to cooking stoves, it is to be understood that it is merely by way of example, since other uses are clearly within the contemplation of the invention.

A still further object of the invention is to provide cyclic operating mechanism of such nature as to readily lend itself to the use of but one prime mover or source of power, for the control of a multiplicity of devices, the individual control of each device being entirely independent of the driving mechanism which may be in operation for the control of other devices in the same unit.

Another object of the invention is to produce a strong, durable, simple and inexpensive construction of the general character outlined; and in order that it may be fully understood, reference is to be had to the accompanying drawings, in which—

Figure 1 is a side elevation of a mechanism in an intermediate position of adjustment, embodying the invention as it may appear in relation to an electric cooking stove or the like.

Figure 1:
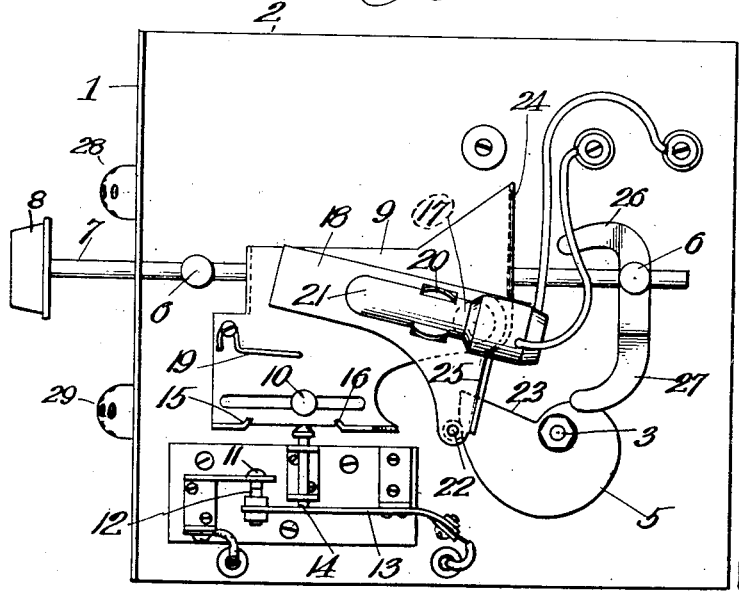
Figure 2:
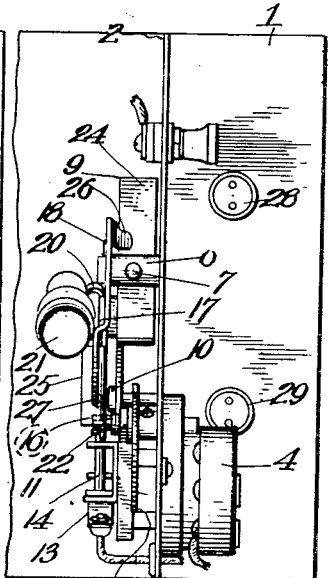
Figure 2 is a rear elevation of the same.
Figure 3:
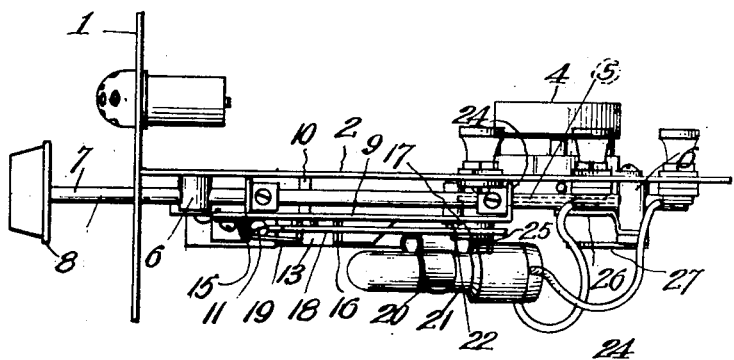
Figure 3 is a top plan view.

In the said drawings, where like reference characters identify corresponding parts in all of the figures, 1 represents a supporting panel, such as the front of an electrical cooking stove, and in fixed relation thereto is a second panel or supporting-frame member 2. Mounted in suitable relation to the panels is a rotating shaft 3, which may be driven by an electric motor 4, or in any other way, it being preferable that the motor shall be of constant speed type for electrical heating control, but in other fields, the motor may be of adjustable speed type to increase the range or flexible characteristic of the timing control as will hereinafter more particularly appear. Keyed or otherwise secured to the shaft 3, in the embodiment shown, is an involute or spiral cam or driven member 5, which in effect constitutes an operating member having an operating or working surface which is progressively shifted or translated as regards a fixed point between what may be considered for convenience as a low point and a high point, so that any shiftable element contacted by the cam will be progressively and continuously translated as long as contact is maintained between the members.

In the representative construction here shown a pair of posts or studs 6 projecting from the panel 2 on the same side as the cam member 5, and mounted in said studs for longitudinal movement, is a rod member 7 which projects through the front panel 1 where it is fitted with an operating handle 8 for manual control of the longitudinal position of the rod. Rigidly secured to the rod for movement therewith is a plate or support 9, which, in the form shown, is provided with a slot adjacent its lower edge engaged with a headed post 10 carried by the panel 2, to hold the asembly so that the operator cannot accidentally rotate the rod 7, the rod thus being confined to reciprocation only.

Control of the electric motor is through a switch mechanism comprising a pair of contacts 11 and 12. The contact 12 is shown as movable as it is carried by the end of a spring arm 13, said spring arm when unrestrained maintaining the motor circuit closed. The motor switch 11—12 may be opened by pressure applied to resilient arm 13 by a non-conducting pin 14 mounted for sliding movement and being sufficiently light in weight as to impose no appreciable load on the spring arm. The upper end of the pin has a conical or cam-like head against which downward pressure is imposed by a pair of inclined plane or cam surfaces 15 and 16 formed at opposite ends of a pair of flanges bent out of the lower edge of the sliding support or plate 9 carried by the manually shifted rod 7. When the rod is shifted to either end of its limits of travel, the motor circuit is interrupted, but when the rod is in any intermediate position, the motor circuit will be closed, as is clearly apparent from an inspection of Figures 1 and 4.

Carried by the shiftable plate or support 9 or shiftable with the rod 7 in any other manner, is a projecting pin 17 on which an operating arm or member 18 is rockingly mounted, movement of said arm in one direction being arrested by an abutment member 19 carried by the plate 9. The abutment 19 may be resilient as shown, to avoid noise if desired. The arm 18 is so proportioned that when unrestrained, it will always gravitate until its front end connects the abutment 19, although, of course, it might be aranged to return to its position under the impetus of a spring or weight if the arm should be mounted so that the force of gravity cannot be utilized. In the embodiment of the invention shown, the arm 18 is provided with a spring clip 20 carrying a gravity switch, such as a metal ball within a tube or a mercury or fluid metal switch 21, it being understood that a plurality of switches may be carried by the arm 18 for controlling as many circuits, the switches being normally "open" or "closed" as desired. The switch will be of such size or capacity as to carry the maximum current of any particular electrical apparatus with which it may be in circuit, such as the electric heating elements shown in Figure 6. The details of the switch are not illustrated since they form no part of the present invention, but it is of course understood that all such switches involve a pair of spaced contacts or poles, the circuit being completed through the contacts by a moving body or element. The particular type of switch here shown is one which is "open" when the switch body is substantially horizontal, a rise of about 3° of the small end of the switch casing with relation to the large end, closing the circuit through the switch. However, the exact operating characteristics of the switch are entirely immaterial, as will hereinafter appear, since the cam or driving surface element 5 may be designed to efficiently perform in accordance with the invention with any type of switch. For example, the switch may be of that which opens the circuit when the switch is in a horizontal position. Where exposed contacts, radio interference, or a slight degree of arcing, are not particularly objectionable, or where the load is small, the use of a mercury or similar switch is not necessary as shown by Figure 7, and as hereinafter more particularly described.

In order to effect timed operation of the element acted upon, or of the switch as illustrated herein, the lower end of the operating arm 18 carries a projecting roller-equipped pin 22, and by sliding the rod 7 backwardly and forwardly, this projecting pin may be positioned to initially intercept the path of travel of the spiral cam 5 at an infinite number of points throughout the length of its operating surface, it being apparent that as the cam 5 is shown as a spiral cam, the manual adjustment of handle 8 inwardly or outwardly is in direct proportion to cyclic switch operation and consequently to the B. t. u. output per unit time of the heating element, in other words, as far as intermittent operation is concerned, one-quarter adjustment of the manual control will equal one-quarter adjustment of cyclic operation; one-half adjustment of the manual control will equal one-half adjustment of cyclic operation, etc. If the slide rod assembly is moved to the right in Figure 1, until the roller pin 22 contacts the cam 5 at its point of smallest radius just far enough to close the mercury switch, it will be evident that rotation of the cam will rock the arm and the switch will be maintained closed as it is translated by movement of the rocking arm over the entire length of the cam. The roller pin 22 will finally ride off the high end of the cam and return by gravity to the point of smallest cam radius, without ever breaking the circuit through the mercury switch. By arranging the parts as shown in Figure 1, whereby the cam surface, 23, when horizontal, is in a plane above the horizontal plane of the axis of the cam 5, and the lower portion of the operating surface of the cam follower, in this case the face of the roller pin 22, is in a horizontal plane below the horizontal plane of the axis of said cam 5, when the arm 18 is in its lowermost position, i. e., in contact with the stop 19, said rocking arm 18 will return to normal position without any abrupt dropping since the roller 22 will then roll down the straight cam surface 23 between high and low cam radii. From this point of continuously "on," the rod 7 may be manipulated to withdraw the assembly so that initial contact of the roller pin 22 shall be at any desired point (infinite adjustment), throughout the length of the operating surface of the cam, until it is entirely withdrawn out of the path of cam travel, at which time the motor circuit through switch 11—12 will be automatically interrupted by member 16, as heretofore mentioned. It will thus be apparent that the distance the operated arm 18 moves, in other words, the length of its path of travel and consequently the time the cyclic switch is closed as compared to the speed of movement of the operating member or rotating cam 5, is subject to infinite adjustment.

Figure 4:
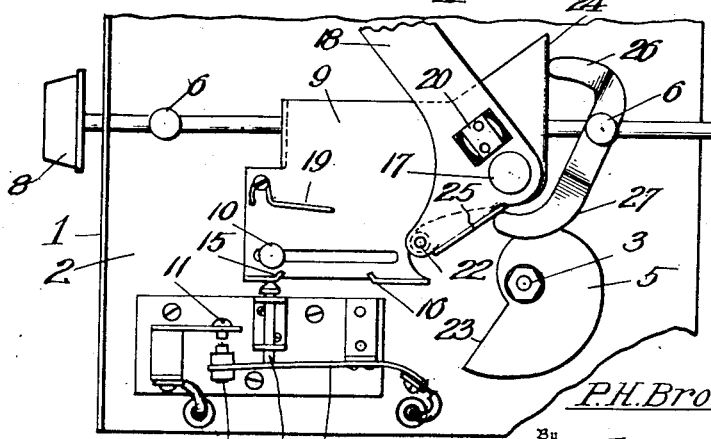
Figure 4 is a fragmental view of the mechanism shown in Figure 1, with the parts moved to one of their limits of adjustment.
Figure 5:
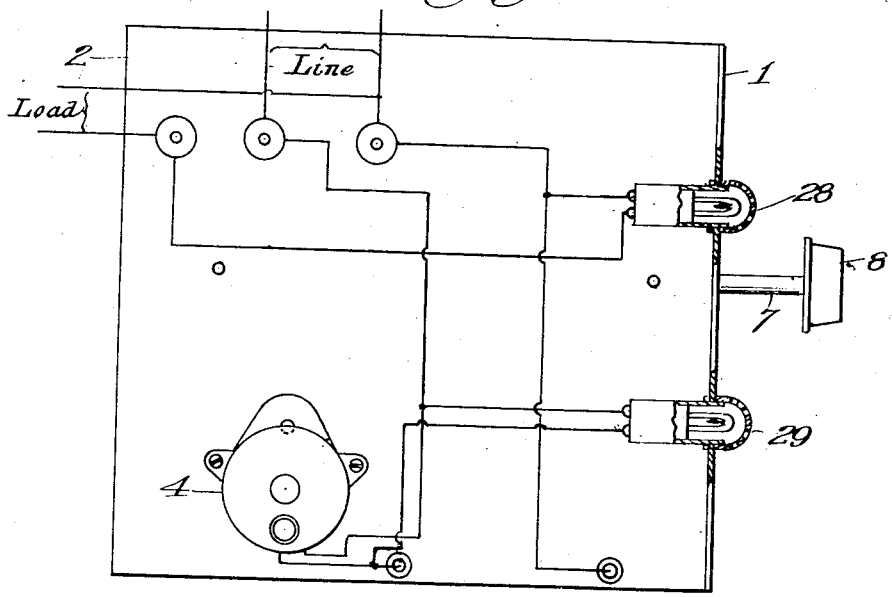
Figure 5 is a view of the opposite side of the structure from that shown in Figure 1.

In view of the fact, however, that at times it may be desired to have the mercury or cam operated switch continuously "on" without the wear incident to cam operation such as above described, and to avoid unnecessary motor operation, the embodiment of the invention shown in Figures 1 to 5 inclusive, is provided with mechanism, whereby the small end of the mercury switch can be moved upwardly slightly beyond the maximum lift of cam-arm operation, and held permanently in this position, the cam operating roller pin 22 being lifted beyond the path of travel of the highest point on the spiral cam 5, and the circuit through the motor being simultaneously broken by operation of switch 11—12 by member 15, as heretofore mentioned. The mechanism for accomplishing the result outlined is, as follows: The rear end of the supporting plate 9 is provided with a flange 24, and the rear end of the rocking arm 18 is also provided with a flange 25. Rockingly mounted on the panel 2 in any suitable way, in the present embodiment being shown as rocking from the end of the rearmost stud 6, is a lever member having a short arm 26 above its pivotal point, and a long arm 27, below its pivotal point, said arm normally standing in the position shown in Figure 1. When the rod 7 is pushed inwardly to its full limit of travel, the short arm 26 is struck by the flange 24 on the plate 9, and the lever immediately commences to swing until its lower end 27 contacts the flange 25 of the rocking arm 18 at a point below the horizontal plane of its center of rocking movement. Continued movement of the rod 7 causes swinging of the rocking arm 18 to the position shown in Figure 4, at which time the roller pin 22 is beyond the path of travel of the highest point of the spiral cam 5. The parts are so proportioned, that the weight of the rocking arm 18 and its assembly is insufficient to overcome the resistance of the slide rod 7 and its assembly, consequently the parts remain in the position described, until the operator manually pulls the rod out or to the left, as shown in Figures 1 and 4.

Figure 6:
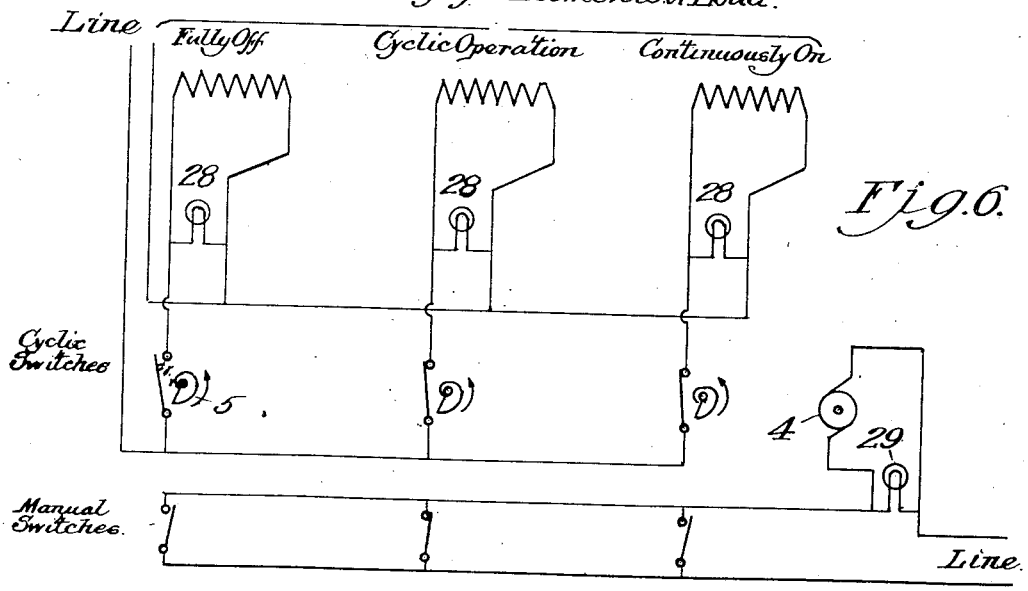
Figure 6 is a diagrammatic view of the device of the invention as it may appear when adapted for controlling a plurality of electric elements, it being understood that the number of elements which may be controlled is limited only by the power of the operating motor as will hereinafter more particularly appear.
Figure 7:
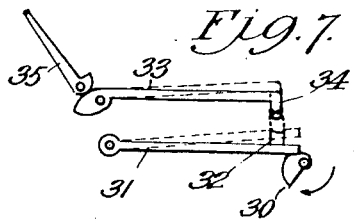
Figure 7 is a diagrammatic view of a slightly modified form of control apparatus.

The type of operating mechanism described particularly lends itself to operation in multiple units as shown diagrammatically in Figure 6, where there is a single motor and drive shaft equipped with a plurality of timing controls involving the invention, all of the individual units being controllable entirely independently of the positions of the other units or controls of the group. In the diagrammatic view the energized elements and the motor circuit are shown as being supplied with current from independent power lines, instead of being fed by the same line as in the other figures. The following table indicates the relationship of the various parts of the apparatus shown in Figure 6:

|  | Fully off | Cyclic operation | Continuously on |
|---|---|---|---|
| Manual slide | Pulled out | Intermediate position | Pushed in. |
| Motor circuit | Broken by member 16 | Closed at 11—12 | Broken by member 15. |
| Cyclic circuit | Broken, switch, horizontal | Switch being moved | Closed, switch moved beyond cam path. |

As indicated structurally in Figures 1 to 5 inclusive, and as shown diagrammatically in Figure 6, the electrical circuits may be provided with suitable tell-tale lights as visual signals or indications of current conditions. Depending upon the carrying characteristics of the lights, each of the operating circuits may have its light in parallel or in series. Uusally the lights will be connected in parallel as indicated in Figure 6, in which each heating element has a tell-tale light 28 and the motor is provided with its own tell-tale light 29, the motor control circuit being subject to the control of any of the slide-operated switches by connecting them in parallel as shown, the heating element circuits also being independent of each other by connecting their mercury or cyclic switches in parallel as illustrated. In practice, each of the heating tell-tale lights will preferably be placed closely adjacent the particular manual control to which it relates and will be differently colored from the motor tell-tale which may be centrally located, for example, red may be used for the tell-tale cyclic circuits and green for the motor circuit. Of course, the control rod for operation of the cyclic circuit may be calibrated in heat units or other visual indications, but it is probable that under average conditions, the operator of the control will soon acquire such familiarity with the flashing period of the red tell-tale lights as to be a good judge of the approximate heat being developed by any particular element.

In Figure 7, a modified construction is shown for use where open contacts, flashing and arcing are not objectionable, or when small loads are to be handled under cyclic control. In this construction there is a driven element or cam 30, and rockingly mounted for continuous translation by the cam, is a lever or operating arm 31, which is moved through a repetitive path of unvarying length. The arm 31 carries a contact 32 forming one pole of a control switch. Pivotally mounted above the first arm is a second arm 33, having a contact 34 constituting the other arm of the control switch. This second arm may be moved toward and from the first arm under the action of a manually adjusted cam lever 35. The arm 33 may be weighted or have a spring to constantly maintain its contact end down or toward the arm 31, as limited by the adjustment of the manual cam 35. Thus the time of closing of the circuit may be controlled by regulation of the time of initial contact of the two poles or switch points, the cam driven arm 31 after having contacted the manually adjusted arm 33, maintaining the circuit constantly closed and the switch as a whole being translated through a path of adjustable length as heretofore referred to. The ultimate result of the operation is the same as previously mentioned.

From the above description it will be apparent that we have produced a process of heat control and a timing apparatus having an infinite increment of adjustment over its full range, which possesses all of the features of advantage set forth as desirable, and while we have described and illustrated the preferred embodiments of the same, it is to be understood that we reserve the right to all changes within the spirit of the invention and without the ambit of the prior art.

We claim:

1. In circuit control apparatus, a manually operated control element, a constantly driven member, an arm for cooperative contact with the driven member to intermittently make and break an electric circuit, an electric motor for driving said driven member, said control element being adapted to position the arm out of the range of movement of the driven element with its controlled circuit selectively disposed in open or closed positions, and a second switch controlling the motor, said second switch being opened when the manual control element is positioned to place the arm out of contact with the driven member.

2. In circuit control apparatus, a driven member, a switch for variable intermittent actuation between on and off positions by travel on said member, and a manually adjustable support for varying the position of the switch to change its period of travel on said member, or to selectively move the switch, independently of the position of the driven member, to constantly on or constantly off, out of the path of travel of said driven member.

3. Electric circuit control apparatus comprising in combination, a manually positionable control element having an infinite increment of adjustment, a constantly rotated involute cam, and a switch for actuation by said cam in variable cycles of time on to time off, said switch being positioned by the manual control element for variable actuation by the involute cam, the position of adjustment of the manual control element over its range of movement being in direct relation to the period of times that the switch is on.

4. Electric circuit control apparatus comprising in combination, a manually positionable control element having an infinite increment of adjustment over a predetermined range of movement, a constantly rotated cam having at least a portion of its operative surface forming an involute curve in relation to the axis of the cam, and a switch for actuation by said cam in variable cycles of time on to time off, said switch being positioned by the manual control element for variable actuation by the cam, the control element cooperating with the involute surface of the cam so that its positions of manual adjustment within the predetermined range are in direct proportion to the periods of time the switch is on.

5. In electric circuit control apparatus, a driven cam, a switch for variable cyclic operation between on and off positions by travel on said cam, and a manually adjustable support for varying the period of travel of the switch on the cam, or to selectively move the switch, independently of the position of the cam, to constantly on or constantly off, out of the path of travel of said cam.

PAUL H. BROWN.
RUSSELL M. CARSON.